United States Patent [19]

Wale

[11] Patent Number: 4,764,059
[45] Date of Patent: Aug. 16, 1988

[54] CONTOURED TOOL BLADES

[75] Inventor: Dennis H. Wale, Old Dalby, England

[73] Assignee: Marwin Cutting Tools, Limited, Rothley, England

[21] Appl. No.: 924,287

[22] Filed: Oct. 29, 1986

[30] Foreign Application Priority Data

Oct. 30, 1985 [GB] United Kingdom ............... 8526696

[51] Int. Cl.$^4$ .............................................. B26D 1/12
[52] U.S. Cl. ........................................ 407/42; 407/40; 407/51; 407/63; 407/114
[58] Field of Search ...................... 407/53, 54, 56, 58, 407/59, 63, 42, 114, 116, 40, 41, 46, 47, 51

[56] References Cited

U.S. PATENT DOCUMENTS

| | | | |
|---|---|---|---|
| 3,117,366 | 1/1964 | Castor | 407/63 |
| 3,409,965 | 11/1968 | Fisher | 407/63 |
| 3,672,017 | 6/1972 | Nielsen et al. | 407/63 |
| 3,775,819 | 12/1973 | Ribich | 407/53 |
| 4,083,643 | 4/1978 | Parone | 407/59 |
| 4,212,568 | 7/1980 | Minicozzi | 407/63 |
| 4,215,955 | 8/1980 | Lillie | 407/42 |
| 4,472,093 | 9/1984 | Hamilton | 407/59 |
| 4,560,308 | 12/1985 | Deller | 407/63 |

FOREIGN PATENT DOCUMENTS 55067 5/1977 Japan .............................. 407/59

Primary Examiner—Frederick R. Schmidt
Assistant Examiner—Lawrence Cruz
Attorney, Agent, or Firm—Pearne, Gordon, McCoy & Granger

[57] ABSTRACT

The invention discloses a rotary tool, for example a milling cutter, having a tool body 2 including at least one helical seating channel into which is brazed, bonded or clamped a cutting blade (8, 18, 30). The blade(s) is/are helical strips of high speed steel or tungsten carbide having a leading edge to cut a work piece. A leading face (10) of the blade has wave-form or castellated grooves to give an undulating or serrated leading edge so that the metal removed from the work piece is removed in small clips not in long lengths of swarf. In examples given, the grooves of the leading face are provided with stop ends (26) to act as a brazing or bonding key. An outer surface (36) of the blade may also be undulating, if required.

7 Claims, 3 Drawing Sheets

CONTOURED TOOL BLADES

BACKGROUND OF THE INVENTION

The invention is concerned with improvements in or relating to contoured tool blades in tools. More particularly, but not exclusively, the invention may relate to the use of one or more contoured blades in a tool body for use in a tool holder of a rotary machine tool for example for milling.

In the use, for example, of a milling cutter, it is desirable not only to cut the metal and to leave as good a surface finish as possible but also to remove the cut metal in an efficient manner.

DESCRIPTION OF THE PRIOR ART

It is known to use for example tungsten carbide blades inserted in seating channels in a tool body of a rotary tool and to secure the blades in place by brazing, bonding or clamping. Such blades have hitherto possessed at least generally rectangular cross-sections and have been received in said seating channels so as to present a continuous leading edge contact with the work-piece.

An alternative form of tool body is one which may be machined totally from a blank of "high-speed" steel or comprises a butt-welded assembly and in which the tool body and cutting edges are therefore integral.

It will be understood that the resulting tool is expensive to produce, not only because of the cost of high speed steel but because of the complex machining operations involved in the forming of the cutting edges and the swarf flutes.

It will be apparent that the removal of cut metal from the work-piece should be achieved as efficiently as possible. The cut material, or swarf, is removed by the flow of machining fluid provided at the work point and is carried away initially along flutes usually provided between the cutting edges.

Attempts have been made to improve the removal of swarf by producing it in smaller pieces, called chips, than in long helically twisted strips as may be produced by a continuous contact cutting edge. The use of a high-speed steel tool with integral cutting edges is known in which the outer tangential surface of the blade section is provided with grooves which traverse the outer surface to give an undulating contour to the cutting edge. This cutting edge is capable of breaking down from the work-piece into chips rather than metal twists.

SUMMARY OF THE INVENTION

The present invention provides in one of its several aspects, a rotary tool comprising a tool body including at least one helical seating channel adapted to receive a cutting blade therein, and a blade secured in said channel, wherein the blade comprises a helical strip of cutting material having a leading edge adapted to contact and cut a work-piece, and a leading face adapted to extend generally radially from the tool body channel, said radially extending leading face being at least partly provided with a plurality of wave-like grooves extending transversely thereof to the leading edge so that said edge is provided with an undulating or serrated configuration.

The invention further provides in another of its several aspects a blade for a tool as described in the preceding paragraph comprising a strip of cutting material having an undulating or serrated leading edge and a leading face provided with wave-like grooves extending from said leading edge transversely over part of the width thereof.

The invention also provides that the strips of cutting material further comprise an outer face, exposed in use so as to extend in a plane at least substantially perpendicular to that of the channel, said outer face being provided with a plurality of wave-like grooves extending transversely thereof.

Advantageously, the strip of cutting material may be tungsten carbide or high speed steel. Conveniently, the tool body may be made from a conventional steel alloy.

It will be appreciated that the formation of the wave-like chip-breaking grooves in the radially extending leading face of the blade according to the present invention is readily achieved by a simple machining, pressing or forging step to produce grooves of any desired profile, depth or spacing. The versatility offered is therefore limited only by the parameters imposed by the desired size and shape of chip formed, in contrast with the obvious difficulties involved in attempts to machine such grooves in the radial faces of cutting portions of an integrally formed high-speed steel tool as mentioned above. Such grooves would necessarily be too wide apart to produce chips of small size. Moreover, the cost of machining such a tool would be extremely high in addition to the high cost of the steel itself.

Blades for insertion in alloy steel or machined tool tool bodies may thus be brazed, bonded or clamped into place in the seating channels as required where the blades are of tungsten carbide. Where the blades are of high speed steel alternative techniques such as welding, for example spot welding, or soldering may be used. A further advantage of the use of the present invention in examples where the blades are secured by brazing or bonding is that the fluid material present while the joint is being formed can flow into the inner ends of the transverse grooves on the blade and key therewith to enhance the joint. Such an arrangement is especially advantageous where the transverse grooves from the leading ledge only across part of the width of the insert. Each groove thus terminates in an end wall or so-called stop-end, over which the fluid material keys. In addition when a clamping technique is used, the presence of grooves in the surface improves the grip of the clamps. The grooves therefore act to improve the retention of the blade inserts in the seating channels.

There will now be described a tool body equipped with several examples of blades according to the invention. It will be understood that the description, which is to be read with reference to the drawings, is given by way of example, is given by way of example only and not by way of limitation.

DESCRIPTION OF THE PREFERRED EMBODIMENTS

Figure 1:
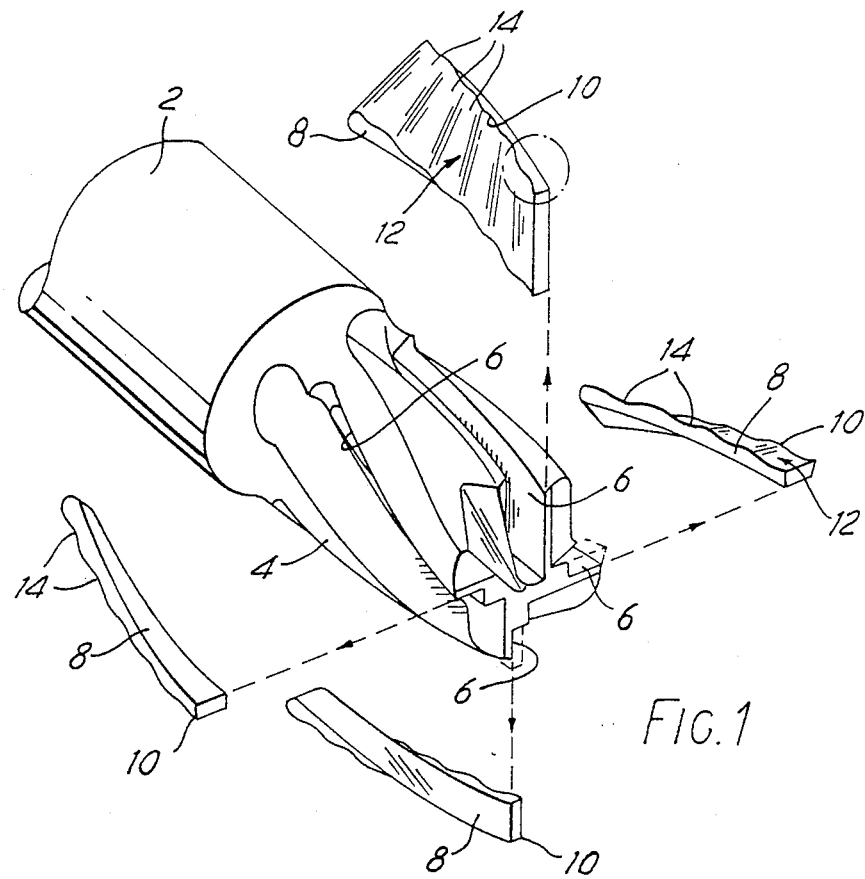
FIG. 1 is an isometric view of a tool body adapted to receive four blades according to a first example.

A tool body 2 shown in FIG. 1 is provided in a head portion 4 thereof with four seating channels 6. Four part-helical blades 8 are provided for insertion in respective ones of the channels 6 so that leading edges 10 protrude therefrom with leading surfaces 12 extending substantially radially inwardly thereof with respect to the rotating axis of the tool.

The channels 6 are conventionally of a part-helical configuration and the blades 8 are formed in a helical manner to provide an accurate fit within the channels. It will be understood that the number of channels provided and their depth and position will be variable as determined by the operating circumstances such as tool diameter and the metal of the work-piece.

Figure 2:
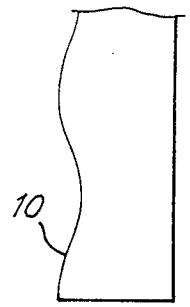
FIGS. 2, 3 and 4 are fragmentary details to an enlarged scale of alternative configurations of leading (cutting) edges of the blades of FIG. 1.
Figure 3:
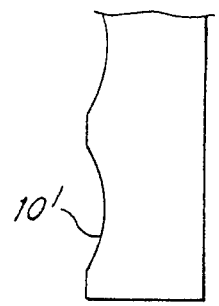
Figure 4:
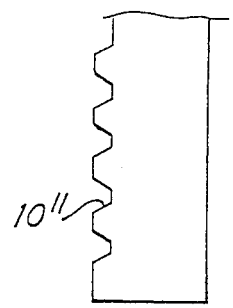
Figure 5:
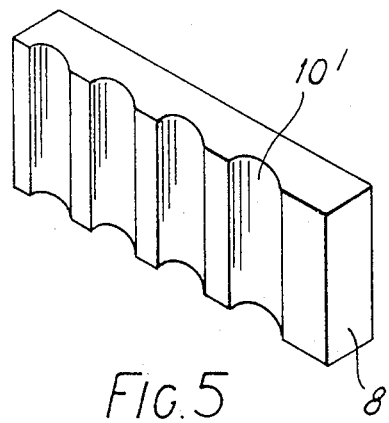
FIG. 5 is a perspective view of the blade of FIG. 3.

The leading surface 12 of each blade illustrated in the Figures is provided with a plurality of transverse grooves 14 having a desired profile, such as curved crest or full sinusoidal wave-form to produce the undulating leading edge 10 (see also FIG. 2). A half-wave form profile produces a leading edge 10' as shown in FIGS. 3 and 5. A so-called semi-castellated wave-form produces the trapezium configuration of the edge 10" shown in FIG. 4.

Figure 6:
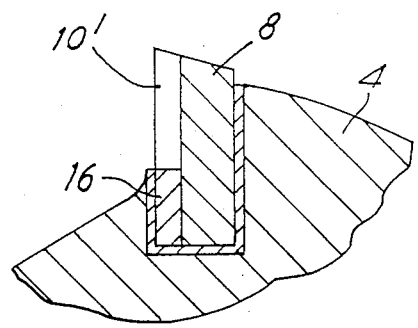
FIG. 6 is a fragmentary sectional view of the blade of FIG. 5 secured in a tool body.

The blades may be secured in place by any manner suitable to their composition. In the present example the blades are of high speed steel bonded to the conventional steel of the head portion 4. FIG. 6 shows the blade of FIGS. 3 and 5 in section with solidified bonding fluid 16 keying into the grooves.

Figure 7:
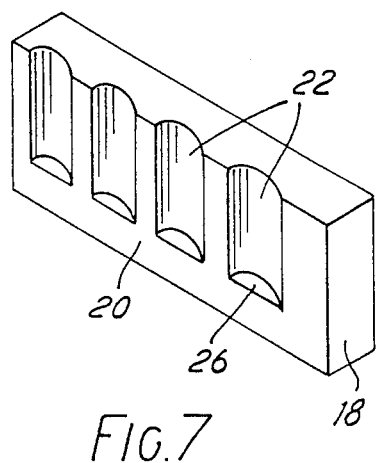
FIG. 7 illustrates a second example of a blade.
Figure 8:
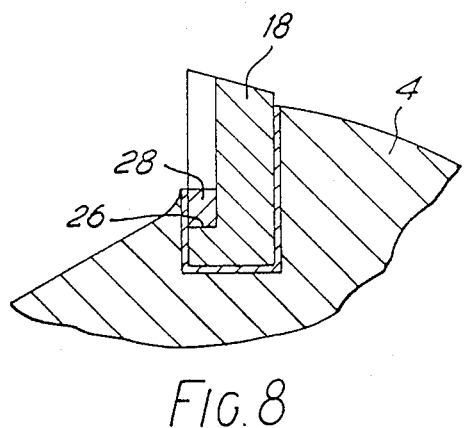
FIG. 8 is a fragmentary sectional view of the blade of FIG. 7 secured in a tool body.

A second example of a blade according to the invention is shown in FIG. 7, which blade, 18, is provided on its leading surface 20 with grooves 22 each of which traverses the leading surface 20 from its leading edge 24 to an end wall 26. When this blade 18 is bonded to the tool head portion 4, the solidified fluid material 28 will be seen to be overlapping the end walls 26 to give enhanced keying (FIG. 8).

Figure 9:
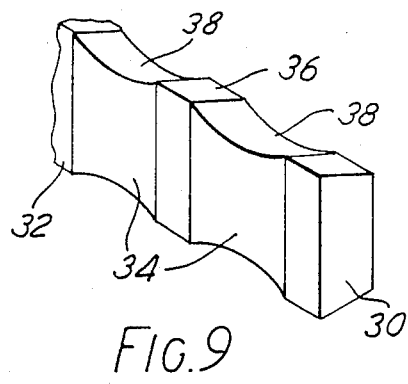
FIG. 9 is a perspective view of a further alternative configuration of leading edges of a blade.

FIG. 9 illustrates a further example of a blade 30 which is provided on its leading surface 32 with grooves 34 and on its outer surface 36 with grooves 38 co-operating with the grooves 34. In this way the leading edge of the blade will be seen to undulate with respect to both faces 32 and 36.

Figure 10:
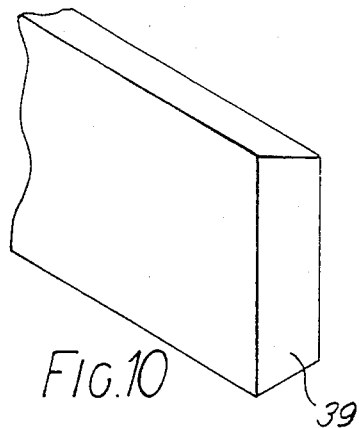
FIG. 10 is a blade configuration not according to the invention but suitable for use in co-operation with blades which are in accordance with the invention.

It will be appreciated that a tool as described above may be both a cutting and a finishing tool and therefore blades may be arrayed around the periphery in a variety selected according to factory requirements. FIG. 10 shows a finishing blade, 39, i.e. one that does not produce "chips", which may be used in association with blades according to the invention.

Figure 11:
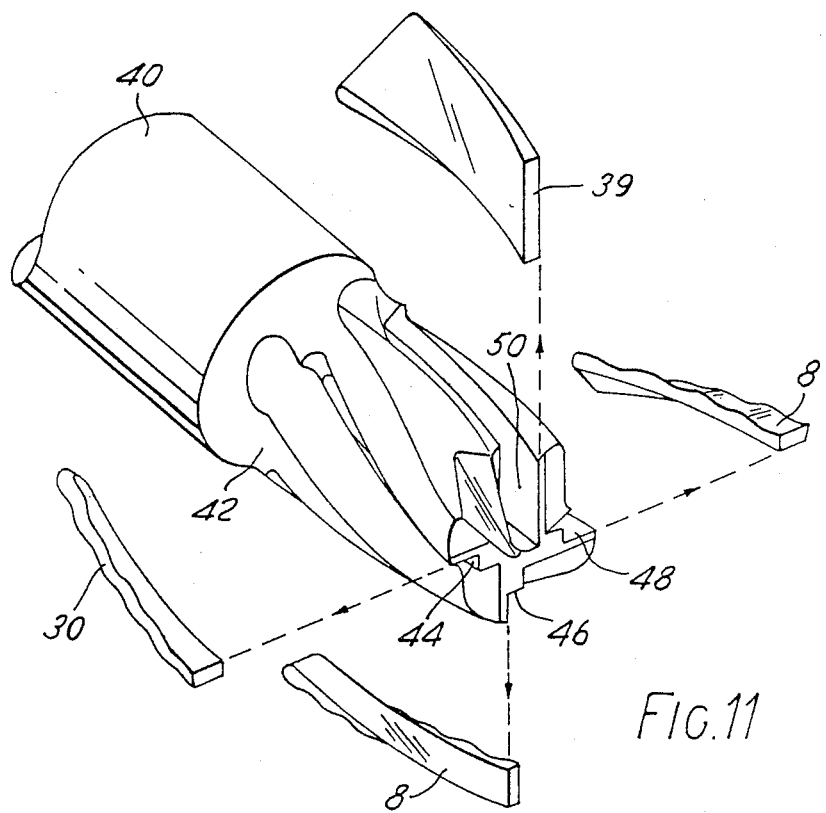
FIG. 11 is an isometric view of a tool body adapted to receive a selected variety of blades according to factory requirements.

For example, in FIG. 11, there is shown a tool body 40 provided in a head portion 42 thereof with four channels 44, 46, 48, 50. In channel 44 is provided a blade 30 of FIG. 9, in channels 46 and 48, a blade as in FIG. 5 and in channel 50, a finishing blade as shown in FIG. 10.

Various modifications may be made within the scope of the invention as defined by the following claims.

I claim:

1. A rotary tool comprising a tool body including at least one helical seating channel adapted to receive a cutting blade therein, and a blade secured in said channel, wherein the blade comprises a helical strip of cutting material having a leading edge adapted to contact and cut a work-piece, and a leading face adapted to extend generally radially from the tool body channel, said radially extending leading face being at least partly provided with a plurality of wave-form grooves extending substantially transversely thereof to the leading edge so that said edge is provided with an undulating or serrated configuration, an end wall being provided across each groove, said blade being adapted to form a non-continuous cutting edge for cutting chips of material such that said chips break upon contact with said end wall.

2. A tool as claimed in claim 1 wherein the helical strip of cutting material received in a channel of the tool comprises an outer face, exposed in use so as to extend in a plane at least substantially perpendicular to that of the channel, said outer face being provided with a plurality of wave-like grooves extending transversely thereof.

3. A tool as claimed in claim 1, wherein the wave formation of the grooves is selected from the group comprising curved crest or full sinusoidal, half waveform and semi-castellated.

4. A tool as claim in claim 1 wherein the leading face of the strip material has a plurality of wave-like grooves extending from said leading edge transversely over part of the width thereof to form a stop or end wall to each of the grooves and means engaging the stops of said grooves to retain said strip material in said channel.

5. A tool as claimed in claim 1 wherein the strip material comprising the blade is brazed or bonded into the channel.

6. A tool as claimed in claim 1 wherein the strip of cutting material is tungsten carbide.

7. A tool as claimed in claim 1 wherein the strip of cutting material is high speed steel.

* * * * *